Jan. 1, 1952     H. I. DAY ET AL     2,581,240
BEARING ASSEMBLY
Filed April 12, 1950
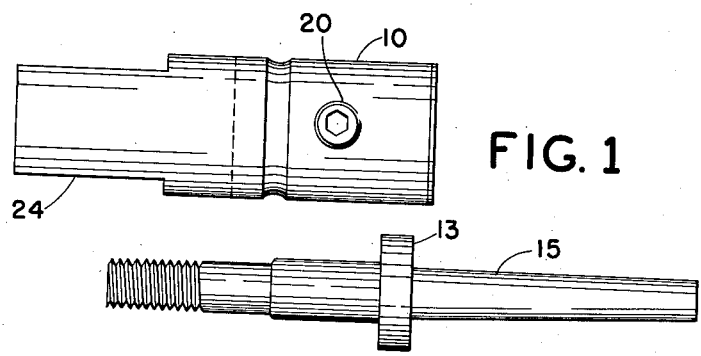
FIG. 1
FIG. 2
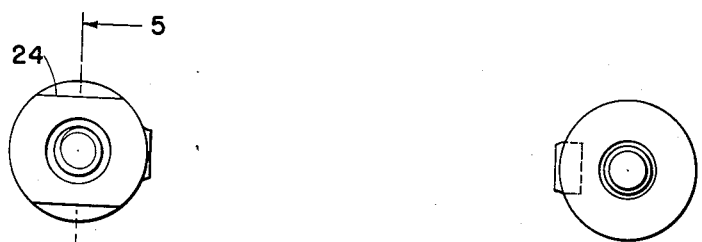
FIG. 4
FIG. 3
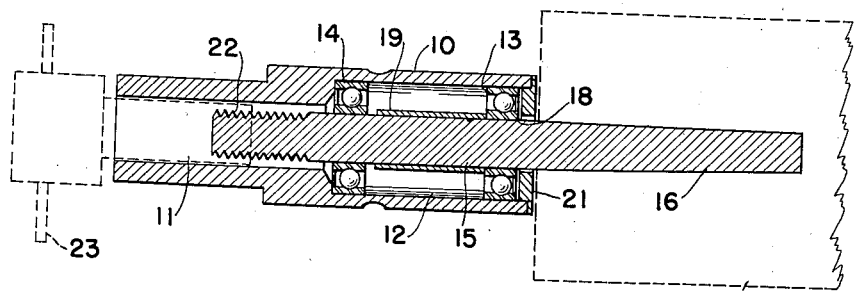
FIG. 5
INVENTORS.
HUGH I. DAY
IVERSON L. DAY
BY Edw. T. Newton
ATTORNEY Patented Jan. 1, 1952

2,581,240

UNITED STATES PATENT OFFICE 2,581,240

BEARING ASSEMBLY

Hugh I. Day and Iverson L. Day, Atlanta, Ga., assignors to A. Pierce Robert and F. H. Robert, jointly, doing business as Atlanta Textile Machinery Company, Atlanta, Ga.

Application April 12, 1950, Serial No. 155,471

5 Claims. (Cl. 19—142)

The present invention relates to a bearing assembly in general but more in particular to an anti-friction bearing assembly for an application pertaining to the top rolls of card room drawing frames.

The advantage of anti-friction bearings, as applied to drawing frames and other machines of similar nature, is well known in the spinning art, and an effort has been made to adapt the same to the top rolls of drawing frames. Complications have arisen, however, in that one of the rolls must be anchored in the side frames in a manner permitting the roll to be adjusted in spaced relationship with the other roll on which it rides, or at least permitting movement from a minimum spacing provided between the two rolls to the maximum thickness of the spun fibers being drawn between them. Should the shafts of both rolls be firmly affixed to the side frames supporting them, then the spaced movement between the rolls could not be provided. Since the top roll must be removed quite frequently for recovering or refinishing, it is desirable that the bearing assembly supporting the roll not only be easily accessible but also easily and quickly removed from its anchoring position in the side frames.

It is an object therefore, of the present invention, to provide a bearing assembly for the top roll of a drawing frame; an identical assembly being used on each end of the roll to permit quick and easy removal of the roll.

Another object of the invention is to provide a bearing assembly for the ends of the top rolls of drawing frames wherein a pair of spaced bearings are mounted in a counter-bore of a cylindrical housing member adapted to be removably supported and held against rotation by the sides of the drawing frames, the shaft extended through the inner races of the bearings being prepared for insertion into the ends of the rolls.

Another object of the invention is to provide a bearing assembly of the character described wherein the shaft supporting the roll may be moved outwardly from a point outside the machine frame to permit disassembly from the roll.

A further object of the invention is to provide a bearing assembly wherein the bearings are held in spaced relationship in the counter-bore of the bearing housing to form a lubrication pocket therebetween. The outside of each bearing will, of course, be provided with a seal to keep the lubrication from leaking from the pocket provided between the spaced bearings.

Other objects and advantages of the invention will become apparent during the course of the following detailed description when viewed together with the accompanying drawing in which:

Fig. 1 is a view of the housing member of my invention.

Fig. 2 is a view of the shaft with one bearing and a spacer mounted thereon.

Fig. 3 is an end view taken from the right end of an assembly of the elements shown in Figs. 1 and 2.

Fig. 4 is an end view of the opposite end of the assembly shown in Fig. 3.

Fig. 5 is a sectional view of the assembly showing how the same is used in association with a top draw roll of a drawing frame. A wrench used for breaking the tapered fit of the shaft end in the roll is shown in position.

In the drawing, numeral 10 designates a bearing housing 10 provided with a bore 11 and a counterbore 12 which extends to a point approximating the center of the length of the housing. Arranged to be fitted into this counter-bore 12 are two bearings 13 and 14 mounted on a shaft 15 having its outer end 16 tapered in conformity with a tapered hole provided in the upper cushion roll 17.

A feature of novelty of the present invention lies in the fits of the two bearings with respect to both the shaft 15 and the bearing housing 10. The outer bearing 13 has its inner race pressed tightly on the shaft in the position shown with the outside of the inner race pressed against a small shoulder 18 left on the shaft when it is ground. The outer race of this particular bearing 13 is mounted for slidable movement laterally within the housing 10.

Also pressed onto the shaft 15, between the inner races of the two bearings, is a spacer member 19. The inner bearing 14 has its inner race slidably mounted on the shaft 15 and its outer race fitted snugly into the housing with one face thereof shouldered in the bottom of the counterbore 12. Such fitting of the two bearings permits the entire shaft, together with the spacer 19 and the outer bearing 13 to be shifted laterally within the housing.

As stated in one of the objects of the invention, one of the chief handicaps to the use of anti-friction bearings in textile machinery is the inability to keep lint and dust from collecting in the bearings and preventing wear and other damage. Since these bearings revolve at relatively high speed, some form of lubrication is necessary. Where prior art bearing assemblies required lubrication every few hours, it is readily apparent in the present invention that annulus defined by the two spaced bearings in the counter-bore 12 forms a convenient reservoir for lubrication preferably in the form of a light grease. Access is gained to this reservoir by means of a threaded hole and a set screw 20.

It will be remembered that the opposite outer sides of the two bearings are provided with sealing rings which precludes the flow of the light grease from the reservoir and which permits lubrication of the two bearings for a considerable length of time. To assist in preventing any lint or the like from entering the outer end of the counter-bore 12, I have placed a flanged ring 21 having a turned shoulder suitable for pressing up into the end of the counter-bore with the outside face thereof barely clearing the rotating roll 17. Such small clearance space between this ring and the roll will keep out all foreign bodies from the internal bearings.

It will be noted that the outer end of the shaft 15 is provided with external threads 22 which project up into the bore 11 of the housing 10. It will also be noted that a slight space is left between the outer end of the spacer member 19 and the inner race of the bearing 14 toward which it is extended. The purpose of this space is to permit the entire shaft, together with the spacer 19 and the forward bearing 13 to be pulled rearwardly into the counter-bore to the point where movement is stopped by the spacer. In so doing the end of the roll strikes the outer flanged ring 21 and the tapered fit between the shaft end 16 and the roll is easily broken. To do this I have provided a special wrench 23 as shown in Fig. 5, provided with internal threads suitable for engagement with the threads provided on the outer end of the shaft 15. When the wrench 23 is used, the shaft and forward bearing 13 are moved inwardly in the manner described above and the entire assembly is easily taken from the roll.

To re-assemble the bearing assembly, the wrench is again screwed into position and, by tapping on the outer end thereof, the forward tapered end 16 of the shaft 15 is driven snugly into position in the roll.

To further facilitate the removal of the assembly from the drawing frame itself, we have provided flats 24 machined on the end surfaces of the housing having a distance across the same slightly less than that of a prepared slot in the drawing frame. This construction prevents rotation of the housing yet provides adequate support for positioning the roll 17 which must be able to move according to the manner described above.

With such a device, the roll is provided with ball bearings which are never exposed to lint and dust even at their dis-assembly therefrom. The roll, when the assembly is removed, is ready to be placed in a lathe or other machine for polishing or turning as the case might be, without the necessity of removing internal shafts, seals, bearings or the like from the roll ends.

We claim:

1. A bearing assembly for the top roll of a card room drawing frame, comprising a cylindrical housing member, means for mounting said housing member to said frame in a manner to prevent rotation thereof, a bore and a counter-bore in said housing, a pair of spaced bearings in said counter-bore, a shaft positioned through said bearings, an end of said shaft projecting from said housing and being provided with a taper substantially matching a corresponding tapered bore provided in an end of said top roll, said shaft being adapted to be wedged into said roll end and to rotate therewith, said tapered end of said shaft being positioned to carry said roll at a minimum clearance distance from the inner end of said housing, and means on the opposite end of said shaft for attaching a tool to cause an outward, longitudinal movement of the shaft to abut the roll end with said housing member to dislodge said tapered shaft end from its wedged position in said roll.

2. A bearing assembly for the top roll of a card room drawing frame, comprising a cylindrical housing member, means for mounting said housing member in a stationary position on said frame, said housing member being provided with a bore and a counter-bore, a pair of bearings positioned in said counter-bore, a shaft extended through said bearings and provided with a tapered outer end adapted to be fitted tightly into an end of said drawing frame roll and to carry the same at a minimum clearance distance from the inner end of said cylindrical housing member, and a spacer mounted on said shaft between said bearings, said spacer being of a length less that the distance between the two bearings to provide a space between the end thereof and one of said bearings greater than the maximum clearance distance between the roll end and the end of said housing member, and said housing member being arranged to permit insertion of a tool into the bore of said housing member to move said shaft longitudinally to abut the roll end to the outer end of said housing whereby said tapered shaft end may be dislodged from its wedged position in said roll.

3. A bearing assembly for roll ends, comprising a housing having a bore and a counter-bore, a pair of bearings positioned within said housing, a shaft for said bearings provided with a tapered end, the larger end of said taper forming a shoulder with the constricted, uniformly turned portion of said shaft, one of said bearings having its inner race pressed on said shaft into an abutting position with said shoulder with the outer race thereof slidably mounted in said counter-bore, a spacer member also pressed on said shaft with one end abutting the inner race of said bearing, the other of said bearings having its inner race slidably mounted on the shaft and its outer race press fitted into the bottom of said counter-bore, the length of said spacer being substantially less than the distance between the inner races of the two bearings and means for moving said shaft and said first named bearing longitudinally within said counter-bore.

4. A bearing assembly for roll ends, comprising a cylindrical housing member provided with a bore and a counter-bore, a pair of bearings spaced in said counter-bore, a shaft for said bearings, said shaft provided with a large tapered end adapted to be inserted into a roll and a stud end of uniform diameter, one of said bearings having its inner race positioned in abutting relationship with the end of the taper and its outer race slidably mounted in said counter-bore, a spacer member pressed on said shaft in a manner to prevent longitudinal movement of said bearing on said shaft, the other of said bearings having its inner race slidably mounted on said shaft and its outer race press fitted into said counter-bore, means for moving said shaft, said spacer and said first named bearing longitudinally in said counter-bore, and stop means limiting the movement in each direction.

5. A bearing assembly for the top roll of a card room drawing frame comprising a cylindrical housing member adapted for removable attachment to said frame and provided with a bore and a counter-bore, a pair of spaced bearings positioned in said counter-bore, a shaft for said bearings, one of said bearings being movable longitudinally only upon said shaft and the other of said bearings being movable longitudinally only within said counter-bore, said shaft provided with an extended tapered end adapted to be wedged into a tapered bore provided on said roll and to carry the same at a minimum clearance distance from the end of said housing, the other end of said shaft provided with externally formed threads adapted for engagement with a tool inserted from the outer end of said housing through the bore thereof for moving said shaft to abut the roll against the end of said housing, whereby the tapered end of said shaft may be dislodged from its wedged position in said roll.

HUGH I. DAY.
IVERSON L. DAY.

REFERENCES CITED

The following references are of record in the file of this patent:

UNITED STATES PATENTS

| Number | Name | Date |
| --- | --- | --- |
| 628,522 | Campbell | July 11, 1899 |
| 678,538 | Campbell | July 16, 1901 |
| 1,395,587 | McLachlan | Nov. 1, 1921 |
| 1,541,530 | Schuman | June 9, 1925 |

FOREIGN PATENTS

| Number | Country | Date |
| --- | --- | --- |
| 870,115 | France | Dec. 5, 1941 |